(12) United States Patent
Harvey et al.

(10) Patent No.: US 11,066,566 B2
(45) Date of Patent: Jul. 20, 2021

(54) INKJET PRINTING SYSTEMS

(71) Applicant: Hewlett-Packard Development Company, L.P., Spring, TX (US)

(72) Inventors: Natalie Harvey, Corvallis, OR (US); Jennifer Wu, Corvallis, OR (US); Thomas W. Butler, Corvallis, OR (US); Vladimir Jakubek, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 57 days.

(21) Appl. No.: 16/497,520

(22) PCT Filed: Jun. 9, 2017

(86) PCT No.: PCT/US2017/036822
§ 371 (c)(1),
(2) Date: Sep. 25, 2019

(87) PCT Pub. No.: WO2018/226242
PCT Pub. Date: Dec. 13, 2018

(65) Prior Publication Data
US 2021/0062025 A1    Mar. 4, 2021

(51) Int. Cl.
*B41J 2/175* (2006.01)
*C09D 11/324* (2014.01)
(Continued)

(52) U.S. Cl.
CPC ......... *C09D 11/324* (2013.01); *B41J 2/17596* (2013.01); *B41M 5/0023* (2013.01); *C09D 11/102* (2013.01)

(58) Field of Classification Search
CPC . B41J 2/17596; B41M 5/0023; C09D 11/102; C09D 11/324
See application file for complete search history.

(56) References Cited

U.S. PATENT DOCUMENTS 5,818,485 A    10/1998  Rezanka
6,752,493 B2    6/2004  Dowell et al.
(Continued)

FOREIGN PATENT DOCUMENTS

EP    1666550    6/2006
WO    0134394    5/2001
(Continued)

OTHER PUBLICATIONS

Crankshaw et al., Ink Recirculation—XAAR TF Technology: A Study of the Benefits, Ingenta Connect, NIP & Digital Fabrication Conference, Printing for Fabrication 2016 (NIP32), Society for Imaging Science and Technology, 2 pages.
(Continued)

*Primary Examiner* — Lamson D Nguyen
(74) *Attorney, Agent, or Firm* — Thorpe North & Western LLP

(57) ABSTRACT

The present disclosure is drawn to an inkjet printing system including an ink composition and a microfluidic ejection assembly. The ink composition can include carbon black pigment, from 50 wt % to 80 wt % water, from 10 wt % to 40 wt % of an organic solvent system, and from 0.5 wt % to 6 wt % polyurethane. The microfluidic ejection assembly can include a drop generator for externally ejecting the ink composition, and a fluid pump for internally inducing microfluidic recirculation flow of the ink composition into the drop generator.

13 Claims, 4 Drawing Sheets

(51) Int. Cl.
*B41M 5/00* (2006.01)
*C09D 11/102* (2014.01)

(56) References Cited

U.S. PATENT DOCUMENTS

| | | |
|---|---|---|
| 8,939,531 B2 | 1/2015 | Govyadinov et al. |
| 9,090,084 B2 | 7/2015 | Govyadinov et al. |
| 9,211,721 B2 | 12/2015 | Govyadinov et al. |
| 9,381,739 B2 | 7/2016 | Govyadinov et al. |

FOREIGN PATENT DOCUMENTS

| | | |
|---|---|---|
| WO | 2008075049 | 6/2008 |
| WO | 2009093751 | 7/2009 |
| WO | 2012027758 | 5/2012 |
| WO | 2013095497 | 6/2013 |
| WO | 2015187179 | 12/2015 |
| WO | 2016092312 | 6/2016 |
| WO | 2017010996 | 1/2017 |
| WO | 2017014742 | 1/2017 |
| WO | 2018217192 | 11/2018 |

OTHER PUBLICATIONS

International Search Report dated Feb. 7, 2018 for PCT/US2017/036822, Applicant Hewlett-Packard Development Company, L.P.

100 ↘

| loading an ink composition into an ink reservoir, the ink composition including carbon black pigment, from 50 wt% to 80 wt% water, from 10 wt% to 40 wt% organic solvent, and from 0.5 wt% to 6 wt% polyurethane; and the ink reservoir fluidly coupled to a microfluidic ejection assembly, the microfluidic ejection assembly including a drop generator for externally ejecting the ink composition, and a fluid pump for internally inducing microcirculation flow of the ink composition into the drop generator |—110 |

| introducing an ink composition into a microfluidic recirculation flow path, the ink composition including carbon black pigment, from 50 wt% to 80 wt% water, from 10 wt% to 40 wt% organic solvent, and from 0.5 wt% to 6 wt% polyurethane |—210 |

| inducing flow of the ink composition within the microfluidic recirculation flow path using a fluid pump positioned along the microfluidic recirculation flow path, wherein the fluid pump is not associated with a printing nozzle |—220 |

| printing the ink composition onto a print medium, wherein printing is by externally ejecting the ink composition from a drop generator that is at a different location than the fluid pump along the microfluidic recirculation flow path |—230 |

FIG. 2

INKJET PRINTING SYSTEMS

BACKGROUND

Inkjet printing has become a popular way of recording images on various media. Some of the reasons include low printer noise, variable content recording, capability of high speed recording, and multi-color recording. These advantages can be obtained at a relatively low price to consumers. As the popularity of inkjet printing increases, the types of use also increase, providing a demand for new inkjet ink compositions.

BRIEF DESCRIPTION OF THE DRAWINGS

FIG. 1 provides a flow chart of an example method of preparing an inkjet printing system in accordance with the present disclosure;

FIG. 2 provides a flow chart of an example method of printing in accordance with the present disclosure;

DETAILED DESCRIPTION

Figure 3:
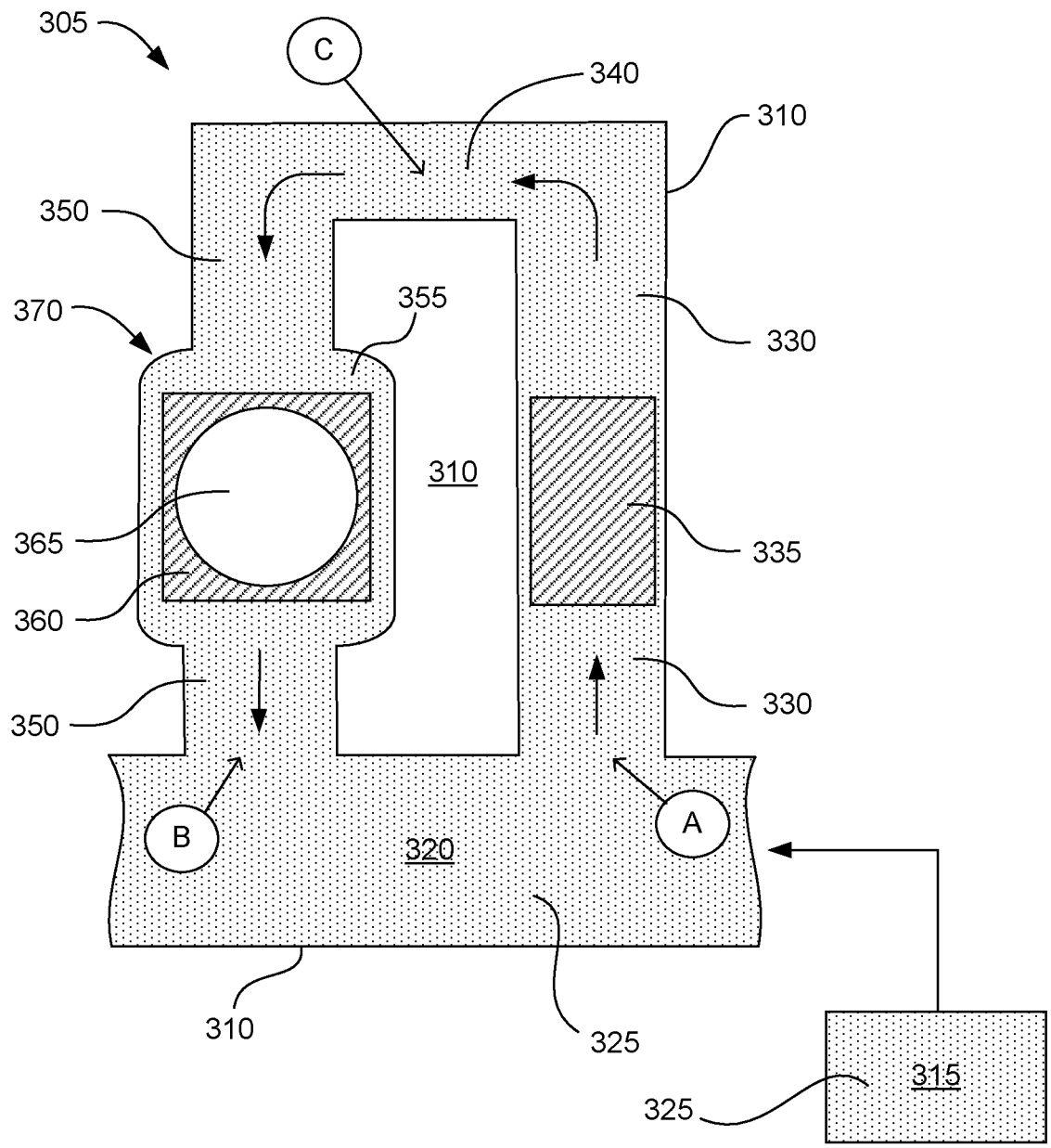
FIG. 3 depicts an example microfluidic ejection assembly and an ink composition of an inkjet printing system in accordance with the present disclosure.

As printing speeds of inkjet printers increase and advancements in inkjet inks occur, printing is moving into areas where there would be a benefit of higher performance, e.g., higher workloads, high output quality, production of crisp prints on plain paper, improved durability, etc. As an example, the production of crisp prints on plain or other similar paper can be challenging in inkjet printing because typical inkjet ink compositions tend to smear. In accordance with the present disclosure, durability of printed images can be improved by using polyurethane, and in some examples, by also using certain durability enhancing solvents at relatively high concentrations, e.g., from 5 wt % to 30 wt %. These durability enhancing solvents can be used with or without other types of organic solvent to enhance durability. However, the use of these components, e.g., the polyurethane and/or the durability enhancing solvents, can lead to printability issues, including kogation, printing plate ink build up, poor decap performance, etc., leading to jetting issues and tube or nozzle clogging. As such, mechanical microfluidic recirculation can contribute to reducing nozzle clogging with some of these more durable inks that can, in some instances, be otherwise difficult to print reliably.

In accordance with this, an inkjet printing system can include an ink composition and a microfluidic ejection assembly. The ink composition can include carbon black pigment, from 50 wt % to 80 wt % water, from 10 wt % to 40 wt % of an organic solvent system, and from 0.5 wt % to 6 wt % polyurethane. The microfluidic ejection assembly can include a drop generator for externally ejecting the ink composition, and a fluid pump for internally inducing microfluidic recirculation flow of the ink composition into the drop generator. With respect to microfluidic recirculation, though some of the ink composition can be jetted out of a printing nozzle at the drop generator, another portion can pass therethrough for further ink flow, including back to the fluid pump for further recirculation.

In another example, a method of preparing an inkjet printing system can include loading an ink composition into an ink reservoir. The ink composition can include carbon black pigment, from 50 wt % to 80 wt % water, from 10 wt % to 40 wt % of an organic solvent system, and from 0.5 wt % to 6 wt % polyurethane. The ink reservoir can be fluidly coupled to a microfluidic ejection assembly. The microfluidic ejection assembly can include a drop generator for externally ejecting the ink composition, and a fluid pump for internally inducing microfluidic recirculation flow of the ink composition into the drop generator. With respect to microfluidic recirculation, though some of the ink composition can be jetted out of a printing nozzle at the drop generator, another portion can pass therethrough for further ink flow, including back to the fluid pump for further recirculation.

In another example, a method of printing can include introducing an ink composition into a microfluidic recirculation flow path. The ink composition can include carbon black pigment, from 50 wt % to 80 wt % water, from 10 wt % to 40 wt % of an organic solvent system, and from 0.5 wt % to 6 wt % polyurethane. An additional step can include inducing flow of the ink composition within the microfluidic recirculation flow path using a fluid pump positioned along the microfluidic recirculation flow path. The method can also include printing the ink composition onto a print medium, wherein printing is by externally ejecting the ink composition from a drop generator that is at a different location than the fluid pump along the microfluidic recirculation flow path.

In further detail regarding the inkjet printing system, the method of preparing the inkjet printing system, and the method of printing, there are other common details that can be implemented in accordance with the present disclosure. For example, as mentioned, the ink compositions used in the inkjet print systems and methods can include an organic solvent system. The organic solvent system, e.g., present at from 10 wt % to 40 w %, can include from 5 wt % to 30 wt % of durability enhancing solvent. The term "durability enhancing solvent" can be defined as organic solvent(s) that contribute to printed ink composition durability, and include solvents having 1 or 2 free hydroxyl groups and 0 to 3 glycol units. Specific examples of durability enhancing solvents include tripropylene glycol, tripropylene glycol methyl ether, tripropylene glycol monobutyl ether, tripropylene glycol monoethyl ether, triethylene glycol, triethylene glycol methyl ether, triethylene glycol monobutyl ether, triethylene glycol monomethyl ether, diethylene glycol, diethylene glycol butyl ether, ethylene glycol, ethylene glycol butyl ether, ethylene glycol phenyl ether, 3-methyl-1,3-butanediol, 2-ethyl-2-hydroxymethyl-1,3,-propanediol, 2-methyl-2,4-pentanediol, 3-methyl-1,5-pentadiol, 2-ethyl-1,3-hexanediol, 1-methoxy-2-propanol, tetraethylene glycol, or a combination thereof. In some examples, the organic solvent system can include only solvent(s) having 1 or 2 free hydroxyl groups and 0 to 3 glycol units. In other words, there is no other type of organic solvent present other than organic solvent(s) having 1 or 2 free hydroxyl groups and 0 to 3 glycol units. In still other examples, the organic solvent system can be present at a relative low concentration, such as from 10 wt % to 20 wt % of the ink composition. Using this low concentration of the organic solvent system, particularly when some or all of the solvent used is also a durability enhancing solvent, provides for ink compositions that can be very durable to wet smear testing, e.g., highlighter smear.

Regarding the microfluidic ejection assembly of the inkjet printing systems and methods, this structure can include a fluid feed channel that provides the ink composition to and receives the ink composition from a microfluidic recirculation flow path. In some examples, the microfluidic recirculation flow path can have a generally unidirectional flow direction. Thus, the fluid pump can be asymmetrically positioned upstream from a mid-point of the microfluidic recirculation flow path. In some examples, the microfluidic ejection assembly can include a second drop generator for externally ejecting the ink composition at a second location. Thus, the fluid pump can be for internally inducing microfluidic recirculation flow of the ink composition into the drop generator, or when there are multiple drop generators, into the drop generator and the second drop generator.

Turning now to more specific detail regarding the ingredients that can be used in the inkjet ink composition of the systems and methods, as noted, the inkjet ink composition can include a carbon black pigment. In one example, the carbon black pigment can be a self-dispersing carbon black pigment. In another example, the carbon black pigment can be surface treated, such as by light, ultra-violet radiation, or ozone. The surface treatment can result in carbon black pigment with an ionized surface, also referred to herein as "ionized carbon black pigment." In one example, the surface treatment can be carried out by exposing the carbon black pigment to both light and ozone, resulting in small molecules being generated at the surface of the carbon black pigment.

The carbon black pigment can be present in the inkjet ink composition at various concentrations. In one example, the carbon black pigment can be present in the ink at from 2 wt % to 8 wt %. In another example, the carbon black pigment can be present at from 3 wt % to 6 wt %. In yet another example, the carbon black pigment can be present from 4 wt % to 5 wt %.

The ink compositions of the systems and methods can also include a polyurethane. The polyurethane tends to improve durability over and above that provided by many other types of binders, but can also lead, in some cases, to printability issues, e.g., kogation, poor decap performance, clogging, etc., particularly at higher concentrations, e.g., from 0.5 wt % to 6 wt %, or from 1.5 wt % to 6 wt %.

The terms "polyurethane" or "polyurethane binder" can be used interchangeably, and include both more traditional polyurethanes as well as polyureas. For example, the polyurethane can include a double bond, polyurethane-graph polyol, etc. The polyurethane can be a graph polyol, such as Pluracol® (available from BASF). In another example, the polyurethane can include an acrylic functional group.

In some other examples, the polyurethane can include an acrylate-containing or methacrylate-containing monoalcohol bonded to the polymer backbone at one end, and an ionic stabilizing group bonded to the polymer backbone at the other end. The polymer can also or alternatively include an acrylate-containing or methacrylate-containing monoalcohol bonded to both ends of the polymer backbone. In still other examples, the polyurethane can include an ionic stabilizing group bonded to both ends of the polymer backbone. In one example, the polyurethane can include a majority of polymer strands with an acrylate-containing or methacrylate-containing monoalcohol bonded to one end of the polymer backbone and an ionic stabilizing group bonded to the other end of the polymer backbone. Further, any combination of these end groups can be used as may be usable with the inks of the present disclosure.

In other examples, the polyurethane can be more pH-stable when particular types of monomers may or may not be included in the polymer backbone and the capping units. In one example, the polymer backbone can be free of ionic stabilizing groups. In particular, the polymer backbone can be devoid of monomers that contain acidic functional groups. In this example, the polyurethane dispersion can include ionic stabilizing groups in the capping units, but not on the polymer backbone. In a specific example, the polymer backbone can be devoid of carboxylate and sulfonate groups.

In still other examples, the polyurethane can be any of a number of polyurethanes that include an isocyanate, and a chain extender leading to either a linear or branched polymer, as well as cycloaliphatic or cycloaromatic components.

The weight average molecular weight of the polyurethane in the composition can vary. In one example, the polyurethane can have an average molecular weight ranging from 3,000 Mw to 70,000 Mw. In yet another example, the weight average molecular weight of the polyurethane can range from 15,000 Mw to 50,000 Mw. In a further example, the polyurethane can have a weight average molecular weight ranging from 5,000 Mw to 25,000 Mw. The polyurethane can, in some instances, have a minimum film-forming temperature from −50° C. to 80° C. In other examples, the polyurethane can have a minimum film-forming temperature from −30° C. to 60° C. or from −25° C. to 50° C.

As mentioned, the ink compositions can include from 0.5 wt % to 6 wt % of the polyurethane. In other examples, the compositions can include from 1.5 wt % to 6 wt % polyurethane, from 3 wt % to 6 wt % polyurethane, from 0.5 wt % to 4 wt % polyurethane, from 1.5 wt % to 4 wt % polyurethane, from 1 wt % to 3 wt % polyurethane, or from 1 wt % to 2 wt % polyurethane. In a further example, the ink compositions can be devoid of polymer binders and latex polymer other than the polyurethane binder.

The polyurethane to carbon black pigment ratio in the ink compositions can also vary. In one example, the polyurethane to carbon black pigment ratio can range from 1:10 to 1:2. In another example, the polyurethane to carbon black pigment ratio can range from 1:8 to 1:2. In yet another example, the polyurethane to carbon black pigment ratio can range from 1:6 to 1:2. In a further example, the polyurethane to carbon black pigment ratio can range from 1:5 to 1:2.

Turning now to the liquid vehicle components, in examples of the present disclosure, the water content in the ink composition can be from 50 wt % to 80 wt %. In another example, the water content can be from 60 wt % to 80 wt %. In yet another example, the water content can be from 65 wt % to 75 wt %. In one example, the water can be deionized, purified, or a combination thereof.

In accordance with examples of the present disclosure, the liquid vehicle, e.g., the liquid components in the ink composition, can also include an organic solvent system in the form of a single organic solvent or a combination of organic solvents. Thus, the term "organic solvent system" includes all of the organic solvents that may be present in the ink compositions described herein. Organic solvent (or solvent) selection can also contribute to the durability of the ink compositions of the systems of methods described herein. The term "solvent" and "organic solvent" can be used interchangeably herein, and does not include water, as water is described separately. In accordance with this, there are certain solvents (or combination of solvents) that can act as durability enhancing solvents. Examples can include solvent(s) with 1 or 2 free hydroxyl groups and 0 to 3 glycol units, such as tripropylene glycol, tripropylene glycol methyl ether, tripropylene glycol monobutyl ether, tripropylene glycol monoethyl ether, triethylene glycol, triethylene glycol methyl ether, triethylene glycol monobutyl ether, triethylene glycol monomethyl ether, diethylene glycol, diethylene glycol butyl ether, ethylene glycol, ethylene glycol butyl ether, ethylene glycol phenyl ether, 3-methyl-1,3-butanediol, 2-ethyl-2-hydroxymethyl-1,3,-propanediol, 2-methyl-2,4-pentanediol, 3-methyl-1,5-pentadiol, 2-ethyl-1,3-hexanediol, 1-methoxy-2-propanol, tetraethylene glycol, or a combination thereof.

It is notable that other types of "secondary" solvent(s) that do not fit into the category of "durability enhancing solvent(s)" can also be included as part of the organic solvent system. These are typically added for other reasons, such as to improve printability, kogation, and decap performance, to name a few. However, the microfluidic ejection assembly described herein can ameliorate reasons to include some of these other types of secondary solvents. In some cases, concentrations of these secondary solvents can be reduced, and in other cases, these types of secondary solvents can be eliminated. Thus, in one example, an ink composition that can be used in the systems and methods of the present disclosure can include from 10 wt % to 40 wt % of an organic solvent system (or total organic solvent content) plus water. In one example, the organic solvent system can include from 5 wt % to 30 wt % durability enhancing solvent(s), from 10 wt % to 30 wt % durability enhancing solvent(s), from 7 wt % to 28 wt % durability enhancing solvent(s), from 7 wt % to 15 wt % durability enhancing solvent(s), or from 14 wt % to 28 wt % of durability enhancing, including durability enhancing solvent(s) with 1 or 2 free hydroxyl groups and 0 to 3 glycol units. In some specific examples, the organic solvent system can be provided by a single solvent with 1 or 2 free hydroxyl groups and 0 to 3 glycol units. In another example, the organic solvent system can be devoid of any secondary solvent(s), e.g., those without 1 or 2 free hydroxyl groups and 0 to 3 glycol units. In another example, the organic solvent system can be present at a concentration of from 10 wt % to 20 wt %. In this example, the durability enhancing solvent(s) with 1 or 2 free hydroxyl groups and 0 to 3 glycol units can be present at from 5 wt % to 20 wt %. When other types of secondary solvents are present, suitable examples of solvents include pyrrolidinones or derivative thereof, e.g., 1-hydroxyethyl-2-pyrrolidinone, 2-pyrrolidinone, or a combination thereof. Other secondary solvents can also be included as part of the organic solvent system in accordance with examples of the present disclosure.

Example concentrations of durability enhancing solvent(s) that can cause nozzle health issues varies to some degree, depending on the durability enhancing solvent(s) selected for use, the presence of other secondary solvents, or the like. In one example, however, concentrations of durability enhancing solvent(s) that provide acceptable durability, and that may in some cases negatively impact nozzle health (without microfluidic recirculation), can range from 5 wt % to 30 wt %, from 10 wt % to 30 wt %, from 7 wt % to 28 wt %, from 7 wt % to 15 wt %, from 14 w % to 28 wt %. Durability enhancing solvent levels above about 12 wt % tend to be even more difficult to print without microfluidic recirculation assistance as described herein.

Consistent with the inkjet ink compositions of the present disclosure, various other additives can be included to enhance properties of the ink composition for specific applications. Examples of these additives can include, but are not limited to, additional polymer binders, latex polymers, solvents, surfactants, antibacterial agents, UV compositions, sequestering agents, buffers, viscosity modifiers, and/or other additives.

In some examples, the inkjet ink compositions can further include a surfactant. In one example, the surfactant can include Surfynol® 104, Surfynol® 440, (both available from Air Products and Chemicals Inc., Pennsylvania), Surfadone™ LP-100 (available from Ashland® Inc., Kentucky), BYK® 3410, BYK® 3400 (both available from BYK® USA Inc. Connecticut), or a combination thereof. The surfactant or combinations of surfactants can be present in the inkjet ink composition at from 0.001 wt % to 10 wt % and; and in some examples, can be present at from 0.001 wt % to 5 wt %. In other examples, the surfactant or combinations of surfactants can be present at from 0.01 wt % to 3 wt % of the inkjet ink composition.

In one example, the surfactant can be a non-ionic surfactant. Specific examples of the non-ionic surfactant that may be used in the ink composition disclosed herein include acetylene diols, bis-tartrate esters, 1,2-hexanediol, mono alcohols, N-alkylpyrrolidinones, and combinations thereof. One example of the acetylene diol is Surfynol® 104 (Products and Chemicals Inc., Pennsylvania). Examples of suitable bis-tartrate esters include diisoamyl tartrate, dibutyl tartrate, dibenzyl tartrate, and diisopropyl tartrate. Some examples of suitable mono alcohols include lauryl alcohol (i.e., 1-dodecanol), oleyl alcohol (i.e., octadec-9-en-1-ol), stearyl alcohol (i.e., 1-octadecanol), and combinations thereof. Examples of the N-alkylpyrrolidinone are N-octylpyrrolidinone and N-dodecylpyrrolidinone. Some commercially available N-alkylpyrrolidinones include Surfadone™ LP-100 (octylpyrrolidinone) and Surfadone™ LP-300 (dodecylpyrrolidinone) (both available from Ashland® Inc., Kentucky). In one example, the non-ionic surfactant that is selected can exclude ethyleneoxy groups.

In one example, an additional component can be added to the in composition to inhibit the growth of harmful microorganisms, such as biocide, fungicide, and/or other microbial agent. Examples of suitable microbial agents can include, but are not limited to, Acticide® (Thor Specialties Inc., Connecticut), Nuosept™ (Troy Corporation, New Jersey.), Ucarcide™ (Union Carbide Corp., Texas), Vancide® (Vanderbilt Minerals, LLC, Connecticut), Proxel® (Lonza Group Ltd., Maryland), and combinations thereof.

In another example, a sequestering agent, such as EDTA (ethylene diamine tetra acetic acid), can be included to eliminate the deleterious effects of heavy metal impurities. In yet another example, buffer solutions can be used to control the pH of the ink.

The inkjet ink compositions of the systems and methods presented herein can provide printed images exhibiting acceptable durability upon drying, including near laser-like and laser-like durability. Durability can be tested using a two-pass highlighter smear test at a time interval of one hour after inkjet printing. As used herein, "two-pass highlighter smear" refers to a smear test conducted with the application of two-passes with a Faber-Castell® highlighter (available from Faber-Castell® Aktiengesellschaft, Germany) at a pressure weight of 500 grams across an image. The image is printed at a predetermined time interval prior to conducting the test, and can be, for example, one hour. The paper used for the two-pass highlighter smear test can be plain paper, such as HP® Multipurpose paper (available from Hewlett-Packard, Co., California). This test can be used to determine a milli-optical density (mOD) measurement of the smear about 1 mm away from the printed image or character. A larger mOD value indicates more smearing and lower print durability for the ink composition, whereas a smaller mOD value indicates less smearing and a higher print durability for the ink composition. Thus, if there is no measurable smear, the mOD measurement would be the color of the highlighted print medium where measured. For comparison, a laser printed image can be highlighted and measured, providing a score of 0 mOD as a reference sample. Thus, any measured smear that performs as well as a laser printed image would also score a 0 mOD by comparison. A highlighter smear value of 20 mOD to 40 mOD can be considered to be a good score, whereas a highlighter smear value of 10 mOD to less than 20 mOD can be considered to be a very good score. A highlighter smear value from 5 mOD to less than 10 mOD can be considered to be near laser-like in durability, and a highlighter smear value of 0 mOD to less than 5 mOD can be considered to be laser-like in durability, with 0 mOD being equal to laser printing. These raw scores can further be used for comparison purposes to evaluate improvement. In one example, by adding from 0.5 wt % to 6 wt % polyurethane and from 5 wt % to 30 wt % durability enhancing solvent (replacing secondary solvent content), durability in a given ink composition can be improved by 10 mOD units or more when tested using a two-pass highlighter smear test at one hour after printing. In another example, the improvement in durability can be 20 mOD units or more. In yet another example, the improvement in durability can be 40 mOD units or more.

Turning now to the FIGS., FIG. 1 sets forth a method of preparing an inkjet printing system 100, which can include loading 110 an ink composition into an ink reservoir. The ink composition can include carbon black pigment, from 50 wt % to 80 wt % water, from 10 wt % to 40 wt % of an organic solvent system, and from 0.5 wt % to 6 wt % polyurethane. The ink reservoir can be fluidly coupled to a microfluidic ejection assembly. The microfluidic ejection assembly can include a drop generator for externally ejecting the ink composition, and a fluid pump for internally inducing microfluidic recirculation flow of the ink composition into the drop generator. In one specific example, the organic solvent system can include form 5 wt % to 30 wt % of a durability enhancing solvent.

In another example, FIG. 2 sets forth a method of printing 200, which can include introducing 210 an ink composition into a microfluidic recirculation flow path. The ink composition can include carbon black pigment, from 50 wt % to 80 wt % water, from 10 wt % to 40 wt % of an organic solvent system, and from 0.5 wt % to 6 wt % polyurethane. An additional step can include inducing flow 220 of the ink composition within the microfluidic recirculation flow path using a fluid pump positioned along the microfluidic recirculation flow path. The fluid pump in this example is not associated with a printing nozzle. The method can also include printing 230 the ink composition onto a print medium, wherein printing is by externally ejecting the ink composition from a drop generator that is at a different location than the fluid pump along the microfluidic recirculation flow path. In one specific example, the organic solvent system can include from 5 wt % to 30 wt % of a durability enhancing solvent having 1 or 2 free hydroxyl groups and 0 to 3 glycol units.

In these methods, as well as in the systems described herein, increasing microfluidic recirculation of the ink compositions can lead to improved nozzle health. This is in part due to poor decap performance for many of highly durable inks described herein without microfluidic recirculation assistance. As mentioned, many solvents that can otherwise provide enhanced print durability when used at increased concentrations can also lead to clogging, plugging, retraction of colorant from the drop forming region of the drop generator, etc., upon exposure to air, e.g., under 2 seconds. In some examples, these same ink compositions can be reliably printed from an inkjet printing system that includes a device for microfluidic recirculation assistance within the microfluidic channel (in addition to that inherently provided by the drop generator). Thus, ink compositions that may otherwise cause clogging, etc., within a very short period of non-jetting activity, e.g., within 2 seconds, can be printed more reliably with longer periods of non-jetting activity, e.g., from 2 seconds to 30 seconds or longer. In further detail, the use of microfluidic recirculation can address nozzle health degradation and printability problems that may be introduced when using polyurethane binders and certain solvents that may otherwise enhance print durability. For example, small pumps can be integrated into a printhead or microfluidic ejection assembly. The fluid pumps can be similar to the resistor(s) or other structure(s) used for ink ejection, but are placed in locations within the microfluidic channel without a corresponding printing nozzle for ejection of the ink composition. Thus, each pump can include a resistor that can be fired separately from the fluid ejection resistors associated with the printing nozzles, ultimately circulating the ink composition and overcoming various nozzle health issues that can be introduced by the durable ink compositions.

In further detail, referring now to FIG. 3, an example system for microfluidic recirculation is shown and described. More specifically, a portion of a printhead or microfluidic ejection assembly 305 with microfluidic recirculation assistance architecture is shown. There are many different component arrangements that can provide microfluidic recirculation assistance, but the structure shown in FIG. 3 provides one example of such an assembly that is suitable for use in accordance with the present disclosure. In this example, the microfluidic ejection assembly can channel, recirculate, and eject an ink composition 325 supplied by an ink reservoir 315. In further detail, the microfluidic ejection assembly can include a substrate 310 with a slot or fluid feed channel 320 formed therein that receives the ink composition from the ink reservoir. The fluid feed channel can be an elongated slot that connects to other microfluidic recirculation channels, for example, and can also be in fluid communication with the ink reservoir which can deliver ink to this portion (and other portions) of the microfluidic ejection assembly. In general, ink composition can be delivered (or printed) from a drop generator 370, which can include a fluid chamber 355, a fluid ejector 360, and a printing nozzle 365. Microfluidic recirculation or flow can be induced by a fluid pump 335, and in some instances further assisted by the firing of the fluid ejector.

As indicated by the black direction arrows in FIG. 3, the fluid pump 335 causes ink from the fluid feed channel 320 to be pumped through a microfluidic recirculation flow path (collectively microchannels 330, 340, 350). In further detail, the fluid feed channel can supply ink into an inlet channel 330 that contains the fluid pump. The fluid pump can be located generally toward the beginning of the recirculation flow path, but does not necessarily need to be in the inlet channel. In this example, the fluid pump location in the inlet channel is convenient because of its relative length, but can be positioned elsewhere. The recirculation flow path then continues through the connection channel 340, and then runs through an outlet channel 350 containing the drop generator 370. Ink composition that is not ejected using by the drop generator, e.g., ejected through the printing nozzle 365 using the fluid ejector 360, can then be returned back to the fluid feed channel for recirculation, for example.

As alluded to above, the exact location of the fluid pump 335 within the inlet channel 330 (or some other channel) may vary to some degree, but can typically be positioned asymmetrically within recirculation flow path 330, 340, 350. Thus, for asymmetric positioning, the fluid pump can be placed prior to a mid-point of the recirculation flow path, shown at point C in this example, to drive the ink directionally as shown. The term "asymmetrical positioning" or "positioned asymmetrically" indicates that the fluid pump is placed "off-center" between an entry opening (shown at point A in this example) and an exit opening (shown at point B in this example) relative to the slot or fluid feed channel 320. To drive the fluid in the direction shown, the fluid pump can be placed asymmetrically downstream from point A and upstream from the mid-point, or point C. Thus, even though the fluid pump is shown in the inlet channel 330 in this example, the fluid pump could be positioned in the connection channel 340 before the mid-point of the length of the recirculation flow path. This latter configuration might be more practical if the inlet channel and outlet channel 350 were shorter in length compared to the length of the connection channel, but regardless, appropriate positioning of the fluid pump within the length of the entire microfluidic recirculation flow path can lead to essentially unidirectional microfluidic flow of the ink being pumped through the microfluidic ejection assembly.

In further detail, the asymmetric location of the fluid pump 335 within the inlet channel 330 can create a short side of the microfluidic recirculation flow path between the fluid pump and the fluid feed channel 320, and a long side of the recirculation flow path that extends from the fluid pump through the connection channel 340 and the outlet channel 350 and back to the fluid feed channel. The asymmetric location of the fluid pump at a shorter side of the recirculation flow path provides a basis for the fluidic diodicity within the recirculation flow path that results in a net fluid flow in a forward direction toward a longer side of the recirculation flow path, as indicated by the black direction arrows.

In further detail, the drop generator 370 can be positioned on the longer side of the microfluidic recirculation flow path, as defined by a length between the fluid pump 335 and point B. As mentioned, the drop generator can include a fluid ejector 360 and a printing nozzle 365 disposed within a fluid ejection chamber 355. The fluid ejector can be any device capable of operating to eject ink drops through a corresponding printing nozzle. Examples include a thermal resistor or piezoelectric actuator. In the illustrated embodiment, one or both of the fluid ejector and the fluid pump can include a thermal resister, such as can be formed from thin film stack. The thin film stack, for example, can be applied to an oxide layer of the substrate 310, and can itself include an oxide layer(s), a metal layer(s), conductive traces, a passivation layer(s), etc. These layers can be configured to thermally generate ink ejection bubbles within the microfluidic recirculation flow path. Although the fluid pump and the fluid ejectors can be thermal resistors, in other examples, one or both of these structures can be any of a variety of pumping or ejecting elements suitable from pumping or ejecting ink, respectively. For example, in some examples, the fluid pump can be a piezoelectric actuator pump, an electrostatic pump, an electro hydrodynamic pump, etc. In other examples, the fluid ejector can be a piezoelectric ejector.

Circuitry, such as integrated circuitry, can be included in the microfluidic ejection assembly 305 for selectively activating the fluid pump 335 and the fluid ejector 360, or multiple fluid pumps and multiple ejectors (not shown). The circuitry can include a drive transistor, such as a field-effect transistor (FET), for example, associated separately with each fluid ejector that may be present. While each fluid ejector can have a dedicated drive transistor to enable individual activation, each fluid pump may or may not have a dedicated drive transistor, as the fluid pumps may or may not be activated individually. Rather, a single drive transistor could power a group of fluid pumps simultaneously. In further detail, drop generators 370 (fluid chamber 355, fluid ejector 360, and printing nozzle 365) generally can be organized into groups, sometimes referred to as primitives. Though only one drop generator is shown in this particular example. A primitive typically can include a group of 6 to 24 drop generators, e.g., 12 drop generators, though this range is not intended to be limiting.

In further detail, pumping using the fluid pump 335 can occur at any frequency that provides adequate microfluidic recirculation to promote general nozzle health. In one example, 25 to 1,000 pumps can be carried out prior to printing. Alternatively, 100 to 700 pumps can be used. With ink compositions that are more difficult to print and retain acceptable nozzle health, from 500 to 1000 pumps, or from 500 to 700 pumps may be more appropriate, but these ranges can be ink composition dependent. The number of pumps prior to printing can be determined by experimentation with a specific ink composition using decap performance as a benchmark as to how many pumps may be needed prior to printing. In still further detail, while printing, pumping the ink composition may be carried out less frequently, or pumping may not be used at all during certain printing events, depending on the time a nozzle may remain dormant between printing events.

Figure 4:
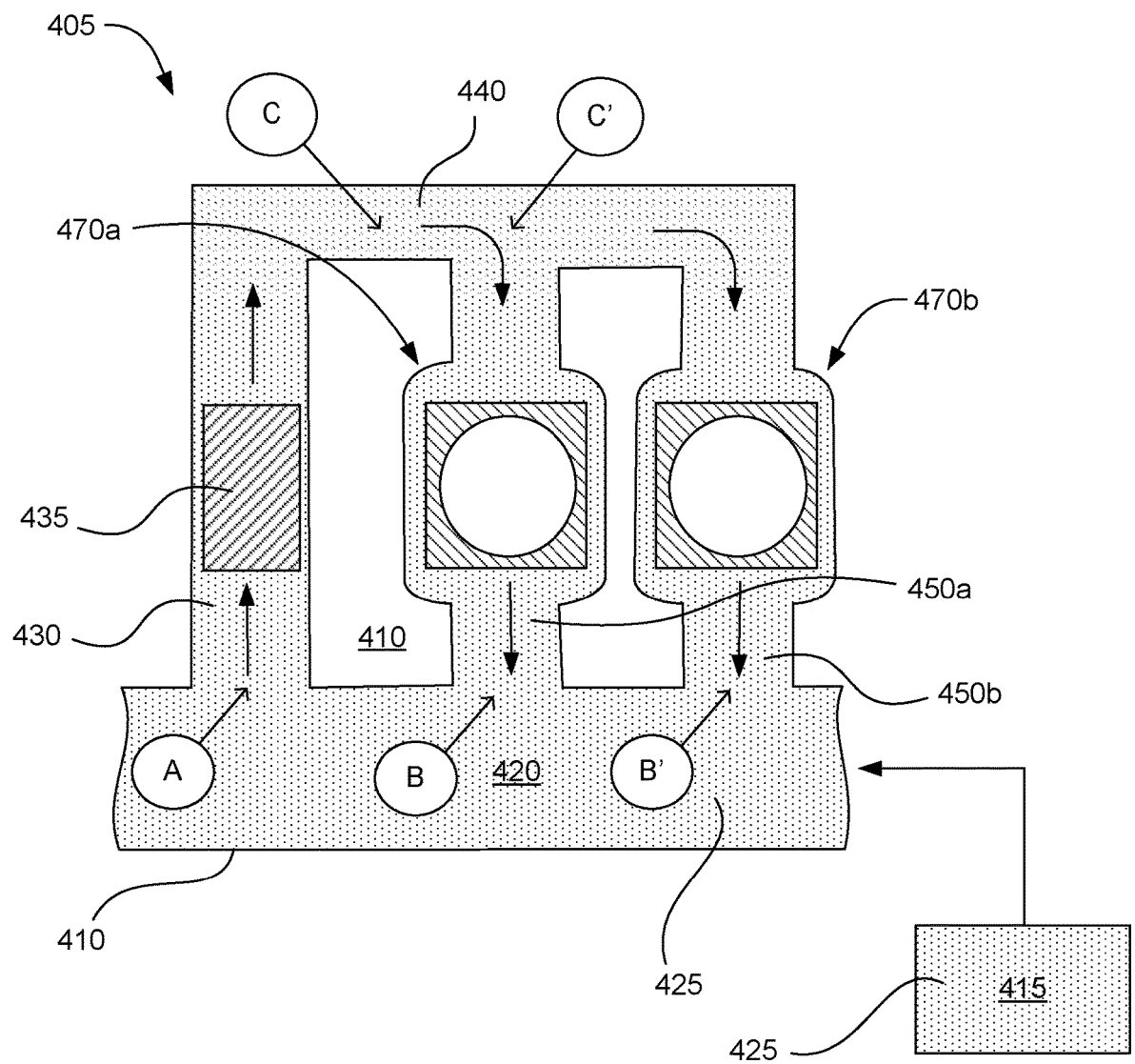
FIG. 4 depicts an alternative example microfluidic ejection assembly and an ink composition of an inkjet printing system in accordance with the present disclosure.

In further detail, when there are multiple drop generators, each can receive microfluidic recirculation assistance from its own fluid pump, as shown in FIG. 3, or multiple drop generators can receive microfluidic recirculation assistance from a single fluid pump, as shown by way of example in FIG. 4. In FIG. 4, a microfluidic ejection assembly, a portion of which is shown at 405, can channel, recirculate, and eject an ink composition 425 supplied by an ink reservoir 415. The microfluidic ejection assembly can include a substrate 410 having a fluid feed channel 420 formed therein. Again, the fluid feed channel can be an elongated slot that connects to other microchannels or other microfluidic recirculation flow paths not shown. The fluid feed channel can be in fluid communication with a fluid supply, such as a fluid reservoir, for delivering ink to this portion (and often other portions) of the microfluidic ejection assembly. In general, ink composition can be delivered (or printed) from a drop generator, similar to that described in FIG. 3. However, in this example, there are two drop generators 470a and 470b that receive microfluidic recirculation assistance from a common fluid pump 435. Thus, in this example, there are two microfluidic recirculation flow paths that include a common inlet channel 430. One recirculation flow path can be defined between entry opening A and an exit opening B, relative to the fluid feed channel. Thus, in this example, the ink flows in the direction indicated by the black direction arrows from inlet opening A, to channel 430, to connection channel 440, to outlet channel 450a, and out exit opening B (back into the fluid feed channel). Mid-point C is illustrated for reference to show that the fluid pump is asymmetrically positioned in the first half of this particular microfluidic recirculation flow path. The other recirculation flow path can be defined between entry opening A and exit opening B', relative to the fluid feed channel. Thus, in this example, the ink flows in the direction indicated by the black direction arrows from inlet opening A, to inlet channel 430, to connection channel 440, to outlet channel 450b, and out exit opening B'. Mid-point C' is illustrated for reference to show that the fluid pump is also asymmetrically positioned in the first half of this particular microfluidic recirculation flow path. Each outlet channel 450a, 450b in this example includes its own drop generator 470a, 470b, respectively. However, as noted, in each case, the microfluidic recirculation assistance for both drop generators in this example is provided by a common fluid pump.

In general, ink compositions with polyurethane and/or relatively high concentrations of durability enhancing solvents with 1 or 2 free hydroxyl groups and 0 to 3 glycol units can provide good ink jet printing durability that approaches the durability of a laser printer. However, as mentioned, because these can be challenging ink compositions to print from inkjet pens, particularly thermal inkjet pens, inkjet printing systems having a microfluidic ejection assembly similar to that shown in FIG. 3 or 4 can be used with acceptable printability and resultant print quality. As an example of use, with some of these durable ink compositions that can be challenging to print, the pumps (335 in FIGS. 3 and 435 in FIG. 4) can provide pumping action prior to printing. In other examples, pumping can occur during printing, or in between printing events. The number of pumps can be from 25 to 1,000, as mentioned, to provide and/or retain nozzle health and acceptable print performance in some examples.

On the other hand, printing some of these highly durable ink compositions from inkjet printing systems without the microfluidic ejection assembly shown in FIG. 3 or 4, e.g., without the fluid pump, can lead to poor nozzle health degradation and poor print performance, e.g., unacceptable kogation, unacceptable decap performance, and clogging in general. For example, one failure mode for nozzle health degradation may be related to decap performance, which refers to the ability of the inkjet ink to readily eject an ink composition from a printhead upon prolonged exposure to air. Decap time can be measured as the amount of time that a printhead may be left uncapped before the printing nozzle no longer fires properly, potentially because of clogging, plugging, and/or retraction of the colorant from the drop forming region of the drop generator (e.g., fluid ejector/ printing nozzle). Thus, for these types of ink compositions, the decap time can often be under two seconds, which is considered to be the minimum standard for a print system of this type. However, with microfluidic recirculation assistance, in one specific example, an ink that had a decap performance of less than 2 seconds without recirculation was found to have acceptable decap performance by engaging fluid pumps from 500 to 700 times prior to printing each drop. For example, decap times could be extended out significantly, e.g., 10 seconds, 20 seconds, 30 seconds, or more of decap performance (where one drop is ejected every 10, 20, 30, etc., seconds) for up to 10 minutes of printing.

It is noted that, as used in this specification and the appended claims, the singular forms "a," "an," and "the" include plural referents unless the content clearly dictates otherwise.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

"Substrate," "media," "medium," "print medium," or "media substrate" includes any base material suitable for printing. In one example, the media can be plain paper. In other examples, the media can be coated paper. In another example, the media can be any substrate suitable for printing, such as paper media with ColorLok Technology® (available from Hewlett-Packard, Co., California).

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight ratio range of 1 wt % to 20 wt % should be interpreted to include not only the explicitly recited limits of 1 wt % and 20 wt %, but also to include individual weights such as 2 wt %, 11 wt %, 14 wt %, and sub-ranges such as 10 wt % to 20 wt %, 5 wt % to 15 wt %, etc.

EXAMPLES

The following examples illustrate the technology of the present disclosure. However, it is to be understood that the following is only illustrative of the application of the principles of the presented systems and methods. Numerous modifications and alternative methods may be devised by those skilled in the art without departing from the present disclosure. The appended claims are intended to cover such modifications and arrangements. Thus, while the technology has been described above with particularity, the following provide further details in connection with what are presently deemed to be the acceptable examples.

Example 1

Several different solvents were tested to determine whether the solvent provided some durability enhancement in combination with polyurethane in ink compositions. Table 1 below provides the results of these tests, as follows:

TABLE 1

| Liquid Vehicle Component | Durability Improvement |
| --- | --- |
| tripropylene glycol | Yes |
| tripropylene glycol methyl ether | Yes |
| tripropylene glycol monobutyl ether | Yes |
| tripropylene glycol monoethyl ether | Yes |
| triethylene glycol | Yes |
| triethylene glycol methyl ether | Yes |
| triethylene glycol monobutyl ether | Yes |
| triethylene glycol monomethyl ether | Yes |
| diethylene glycol | Yes |
| diethylene glycol butyl ether | Yes |
| ethylene glycol | Yes |

TABLE 1-continued

| Liquid Vehicle Component | Durability Improvement |
|---|---|
| ethylene glycol butyl ether | Yes |
| ethylene glycol phenyl ether | Yes |
| 3-methyl-1,3-butanediol | Yes |
| 2-ethyl-2-hydroxymethyl-1,3,-propanediol | Yes |
| 2-methyl-2,4-pentanediol | Yes |
| 3-methyl-1,5-pentadiol | Yes |
| 2-ethyl-1,3-hexanediol | Yes |
| 1-methoxy-2-propanol | Yes |
| tetraethylene glycol | Yes |
| 2-pyrrolidinone | No |
| 1-hydroxyethyl-2-pyrrolidinone | No |
| 3-methyl-1,3,5-pentanetriol | No |

In further detail regarding the data presented in Table 1, essentially, by replacing some or all of some more typical solvent(s) (e.g., 2-pyrrolidinone, 1-hydroxyethyl-2-pyrrolidinone, and/or other non-hydroxylated solvent) with 5 wt % or more of solvent with 1 or 2 free hydroxyl groups and 0 to 3 glycol units, durability could generally be enhanced upon drying of the ink composition on a print medium. Thus, in Table 1, the solvents that generally were found to enhance durability of inks are notated as "Yes" in the Durability Improvement column. Notably, 2-pyrrolidinone (0 hydroxyl groups), 1-hydroxyethyl-2-pyrrolidinone (0 hydroxyl groups), and 3-methyl-1,3,5-pentanetriol (3 hydroxyl groups) were not found to enhance durability. At the same time, when durability enhancing solvents were added to ink compositions at relative high concentrations, e.g., from 5 wt % to 30 wt %, from 7 wt % to 15 wt %, or from 14 wt % to 28 wt %, printability issues began to be introduced, e.g., kogation issues, decap issues, clogging, etc. In other words, using durability enhancing solvent(s) listed in Table 1 (and other similar solvent(s)), from very good to laser-like durability could be achieved as measured by two-pass highlighter smear testing. However, in many instances, printing these inks could be labor intensive, with printheads undergoing extensive manual servicing just to print a single diagnostic plot. Thus, to obtain higher levels of durability with these types of inks, it was found that the use of microfluidic recirculation fluid pumps could solve some of these printability problems. For example, by internally inducing microfluidic recirculation flow using a fluid pump positioned within a microfluidic channel (separate and distinct from the ink movement provided by the drop generator), acceptable printing performance could be achieved.

Example 2

To assess whether or not microfluidic recirculation is helpful for improving the printability, an ink composition prepared in accordance with examples of the present disclosure was printed utilizing microfluidic recirculation architecture similar to the microfluidic ejection assembly shown in FIG. 3 or 4, but only firing the fluid ejector resistors (no pumping using the fluid pumps) to emulate the behavior of the ink in a standard pen architecture. The ink composition tested included 1.7 wt % of polyurethane, 11 wt % tetraethylene glycol, 8 wt % 2-ethyl-1,3-hexanediol, and 5 wt % 1-hydroxyethyl-2-pyrrolidinone. In this example, a diagnostic plot was printed to evaluate print performance. The same ink was also printed using two different diagnostic plots with the assistance of the fluid pumps. One diagnostic plot was prepared by varying the number of pumps at a constant pumping frequency. The other diagnostic plot was prepared using a constant number of pumps while pumping at different frequencies. The diagnostic plot prepared without the use of any pumping generated a print sample with poor decap performance, marked by the complete absence of the bottom half of several printed lines. On the other hand, the use of pumping generally (by either technique) provided improvements in decap over various time points, removing noticeable defects from the printed lines. For example, a 30 second decap (where one drop is ejected every 30 seconds) was able to be sustained for up to 10 minutes of printing after engaging the fluid pumps from 500 to 700 times prior to printing.

Example 3

Four ink compositions were prepared, each containing only a single high concentration of a durability enhancing solvent as set forth in Table 1. In other words, the organic solvent system consisted of only one solvent, and the solvent was a durability enhancing solvent. These four inks were not particularly suitable or usable for printing from a standard inkjet pen at these concentrations because of poor decap performance e.g., less than 2 seconds, kogation issues, and clogging. However, using print assistance with a microfluidic assembly such as that shown in FIG. 3 or 4, the following ink compositions could be printed with acceptable reliability. These inks generally had acceptable decap performance, e.g., up to 15 seconds or more; good kogation, and very little if any clogging. The ink formulations prepared are shown in Table 2 as Inks A-D, as follows:

TABLE 2

| | Weight Percent (wt %) | | | |
|---|---|---|---|---|
| Component | Ink A | Ink B | Ink C | Ink D |
| Self-dispersed carbon black pigment | 4.4 | 4.4 | 4.4 | 4.4 |
| 2-Ethyl-1,3-hexanediol | 20 | — | — | — |
| Tripropylene glycol monoethyl ether | — | 25 | — | — |
| Triethylene glycol monobutyl ether | — | — | 25 | — |
| 1-Methoxy-2-propanol | — | — | — | 24 |
| Surfynol ® 104 | 0.05 | 0.05 | 0.05 | 0.05 |
| Surfadone ™ LP-100 | 0.05 | 0.05 | 0.05 | 0.05 |
| Acticide B20 | 0.2 | 0.2 | 0.2 | 0.2 |
| Acticide M20 | 0.07 | 0.07 | 0.07 | 0.07 |
| Polyurethane | 1.7 | 1.7 | 1.7 | 1.7 |
| Deionized water | Balance | Balance | Balance | Balance |

Example 4

Six ink compositions were prepared that included about 24 wt % to 25 wt % of an organic solvent system, with from 5 wt % to 20 wt % of durability enhancing solvent(s) of Table 1. At the lower concentrations of the durability enhancing solvent(s), e.g., 5 wt %, the ink compositions can be printed with some limited success without the use of a microfluidic ejection assembly with microfluidic recirculation assistance. However, print reliability and nozzle health can still be enhanced by using microfluidic recirculation in accordance with examples of the present disclosure, e.g., decap performance can be brought out to 20 to 30 seconds with some pumping prior to firing. On the other hand, the inks that included from 15 wt % to 20 wt % of the durability enhancing solvent could not easily be printed reliably from an inkjet printhead without microfluidic recirculation printer assistance e.g., from 500 to 700 pumps were used prior to printing. The inks evaluated are provided in Table 3, as follows:

TABLE 3

| Component | Weight Percent (wt %) | | | | | |
|---|---|---|---|---|---|---|
| | Ink E | Ink F | Ink G | Ink H | Ink I | Ink J |
| Self-dispersed carbon black pigment | 4.4 | 4.4 | 4.4 | 4.4 | 4.4 | 4.4 |
| 2-Ethyl-1,3-hexanediol | — | 5 | — | — | — | 8 |
| Triethylelene glycol monobutyl ether | 5 | — | — | 20 | — | — |
| Tripropylene glycol monoethyl ether | — | — | 5 | — | — | — |
| Diethylene glycol butyl ether | — | — | — | — | 15 | — |
| Tetraethylene glycol | — | — | — | — | — | 11 |
| 2-pyrroliodinone | 8 | 8 | 8 | — | 10 | — |
| 1-(2-hydroxyethyl)-2-pyrrolidinone | 11 | 11 | 11 | 5 | — | 5 |
| Surfynol ® 104 | 0.05 | 0.05 | 0.05 | 0.05 | 0.05 | 0.05 |
| Surfadone ™ LP-100 | 0.05 | 0.05 | 0.05 | 0.05 | 0.05 | 0.05 |
| Acticide B20 | 0.2 | 0.2 | 0.2 | 0.2 | 0.2 | 0.2 |
| Acticide M20 | 0.07 | 0.07 | 0.07 | 0.07 | 0.07 | 0.07 |
| Polyurethane | 1.7 | 1.7 | 1.7 | 1.7 | 1.7 | 1.7 |
| Deionized water | Balance | Balance | Balance | Balance | Balance | Balance |

Example 5

Ink compositions with only about 15 wt % of an organic solvent system with varied concentrations of polyurethane (from 1.7 wt % to 5 wt %) were prepared to further challenge the microfluidic ejection assemblies of the present disclosure. These ink compositions provided very durable printed images, but would otherwise be difficult to print reliably from a standard printhead without a microfluidic recirculation assistance mechanism, such as a fluid pump as described in FIG. 3 or 4. Essentially, by lowering the concentration of the organic solvent system, e.g., to about 15 wt %, improvements in durability could further be achieved. As far as printability was concerned, the microfluidic ejection assembly described herein was able to print these ink compositions reliably by implementing from 500 to 700 pumps prior to printing. The ink compositions are shown in Table 4, as follows:

TABLE 4

| Component | Weight Percent (wt %) | | |
|---|---|---|---|
| | Ink K | Ink L | Ink M |
| Self-dispersed carbon black pigment | 4.4 | 4.4 | 4.4 |
| 2-Ethyl-1,3-hexanediol | 5 | 5 | — |
| 2-methyl-1,3-propanediol | — | — | 5 |
| Tripropylene glycol monoethyl ether | — | — | 5 |
| 2-pyrroliodinone | 10 | — | — |
| 1-(2-hydroxyethyl)-2-pyrrolidinone | — | 10 | 4.9 |
| Surfynol ® 104 | 0.05 | 0.05 | 0.05 |
| Surfadone ™ LP-100 | 0.05 | 0.05 | 0.05 |
| Acticide B20 | 0.2 | 0.2 | 0.2 |
| Acticide M20 | 0.07 | 0.07 | 0.07 |
| Polyurethane | 5 | 3.5 | 1.7 |
| Deionized water | Balance | Balance | Balance |

Example 6

Some of the ink compositions in Tables 1-4, namely Inks B, J, K, L, and M, were printed, dried for 1 hour, and tested for their durability using the two-pass highlighter spear testing protocol described herein. Identical text images were printed with an ink flux at about 60 ng/300$^{th}$ of an inch using standard characters (Times New Roman font; 12 point font size) followed by a larger circle having a very thin circumference line (printed using a HP® Officejet® Pro 8000 inkjet printer available from available from Hewlett-Packard, Co., California). The printing was carried out using HP® Multipurpose paper media with ColorLok Technology® (available from Hewlett-Packard, Co., California).

Figure 5:
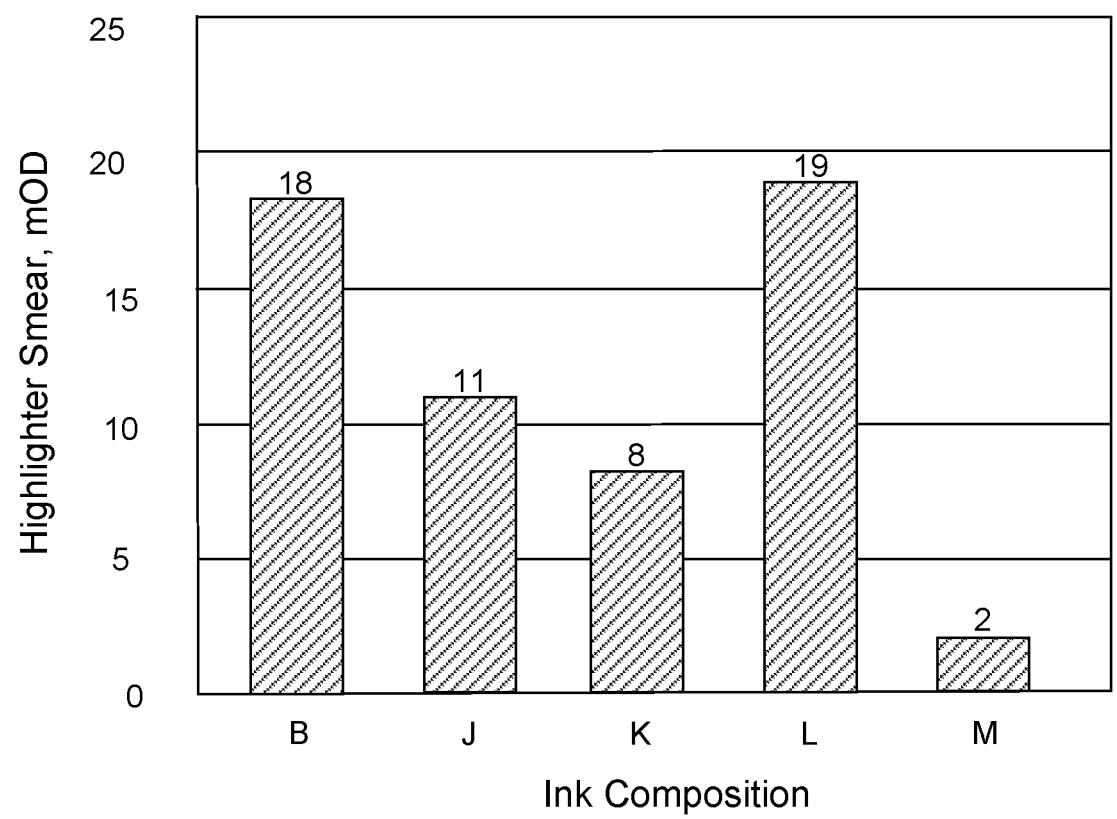
FIG. 5 depicts a bar graph of example durability data prepared from ink compositions of an inkjet printing system in accordance with the present disclosure.

After drying for one hour, the two-pass highlighter smear test was conducted on each of Inks B, J, K, L, and M. Specifically, a standard yellow Faber-Castell® highlighter (available from Faber-Castell® Aktiengesellschaft, Germany) was passed over the image at 500 grams weight pressure, two times. The smear was measured using a portable GretagMacbeth® Spectrolino® densitometer (discontinued, previously available from X-Rite®, Inc., Missouri) to determine the milli-optical density (mOD) of the smear trail. A high mOD value indicated a greater degree of smearing and a less durable ink composition, and a low mOD value indicated less smearing and a more durable inkjet ink composition. In addition to the perpendicular friction of the pen tip itself, there is also the effect of the highlighter wetting of the printed medium. With many inkjet inks, when a printed area is abraded and wetted, the pigment tends to migrate with the highlighter tip across the media. The amount of migrated pigment thus causes a measurable trailing mark or smear in the breaks between printed characters (and around the printed characters). This migrated pigment is then measured at about 1 mm from the printed image or character. The data for the two-pass highlighter smear test is provided in FIG. 5 in units of optical density (milli-OD, mOD).

As can be seen by the data, Inks B and L achieved durability scores just under 20 mOD, which is very good durability. Ink J, which included 19 wt % of a combination of two durability enhancing solvents, performed even better than Inks B and L. Ink K, which included the highest concentration of polyurethane, achieved a still better score of 8 mOD, which approached laser-like durability. Ink M performed the best, with a laser-like score of 2 mOD. Notably, Ink M only contained 1.7 wt % polyurethane and only 10 wt % of durability enhancing solvent. However, this ink composition was prepared with a very low organic solvent system content of 15 wt %. None of these inks can be jetted easily with good reliability from a standard thermal inkjet pen, and thus, the microfluidic ejection assembly with microfluidic recirculation assistance pumps as described herein provided the ability to print these highly durable inks with good reliability.

While the present technology has been described with reference to certain examples, those skilled in the art will appreciate that various modifications, changes, omissions, and substitutions can be made without departing from the spirit of the disclosure. It is intended, therefore, that the disclosure be limited only by the scope of the following claims.

What is claimed is:

1. An inkjet printing system, comprising:
 an ink composition, including:
  carbon black pigment,
  from 50 wt % to 80 wt % water,
  from 10 wt % to 40 wt % of an organic solvent system consisting essentially of an organic solvent having 1 or 2 free hydroxyl groups and 0 to 3 glycol units, and
  from 0.5 wt % to 6 wt % polyurethane; and
 a microfluidic ejection assembly.

2. The inkjet printing system of claim 1, wherein the organic solvent is selected from tripropylene glycol, tripropylene glycol methyl ether, tripropylene glycol monobutyl ether, tripropylene glycol monoethyl ether, triethylene glycol, triethylene glycol methyl ether, triethylene glycol monobutyl ether, triethylene glycol monomethyl ether, diethylene diethylene glycol butyl ether, ethylene glycol, ethylene glycol butyl ether, ethylene glycol phenyl ether, 3-methyl-1,3-butanediol, 2-ethyl-2-hydroxymethyl-1,3,-propanediol, 2-methyl-2,4-pentanediol, 3-methyl-1,5-pentadiol, 2-ethyl-1,3-hexanediol, 1-methoxy-2-propanol, tetraethylene glycol, or a combination thereof.

3. The inkjet printing system of claim 1, wherein the organic solvent system is present at from 10 wt % to 20 wt %.

4. The inkjet printing system of claim 1, wherein the microfluidic ejection assembly includes a fluid feed channel that provides the ink composition to and receives the ink composition from a microfluidic recirculation flow path.

5. The inkjet printing system of claim 4, wherein the microfluidic recirculation flow path has a generally unidirectional flow direction, wherein a fluid pump is positioned within the microfluidic recirculation flow path, and wherein the fluid pump is asymmetrically positioned upstream from a mid-point of the microfluidic recirculation flow path.

6. The inkjet printing system of claim 1, wherein the microfluidic ejection assembly includes,
 a drop generator for externally ejecting the ink composition;
 a second drop generator for externally ejecting the ink composition at a second location; and
 a fluid pump for internally inducing microfluidic recirculation flow of the ink composition into both the drop generator and the second drop generator.

7. The inkjet printing system of claim 1, wherein the microfluidic ejection assembly includes a drop generator for externally ejecting the ink composition.

8. The inkjet printing system of claim 7, wherein the microfluidic ejection assembly includes a fluid pump for internally inducing microfluidic recirculation flow of the ink composition into the drop generator.

9. The inkjet printing system of claim 8, further comprising a microfluidic recirculation flow path that includes an inlet channel to deliver the ink composition to the fluid pump and an outlet channel to direct a portion of the ink composition to the drop generator.

10. A method of preparing an inkjet printing system, comprising:
 loading an ink composition into an ink reservoir,
  the ink composition including:
   carbon black pigment,
   from 50 wt % to 80 wt % water,
   from 10 wt % to 40 wt % of an organic solvent system consisting essentially of an organic solvent having 1 or 2 free hydroxyl groups and 0 to 3 glycol units, and
   from 0.5 wt % to 6 wt % polyurethane; and
 fluidly coupling the ink reservoir to a microfluidic ejection assembly.

11. The method of claim 10, wherein the organic solvent system is present at from 10 wt % to 20 wt %.

12. The method of claim 10, wherein the microfluidic ejection assembly comprises:
 a fluid pump for internally inducing microfluidic recirculation flow of the ink composition into a drop generator, wherein a microfluidic recirculation flow path has a generally unidirectional flow direction, wherein the fluid pump is positioned within the microfluidic recirculation flow path, and wherein the fluid pump is asymmetrically positioned upstream from a mid-point of the microfluidic recirculation flow path; and
 a fluid feed channel for receiving the ink composition from the ink supply, wherein the fluid feed channel provides the ink composition to and receives the ink composition from the microfluidic recirculation flow path.

13. A method of printing, comprising:
 introducing an ink composition into a microfluidic recirculation flow path, the ink composition including carbon black pigment, from 50 wt % to 80 wt % water, from 10 wt % to 40 wt % of an organic solvent system consisting essentially of an organic solvent having 1 or 2 free hydroxyl groups and 0 to 3 glycol units, and from 0.5 wt % to 6 wt % polyurethane;
 inducing flow of the ink composition within the microfluidic recirculation flow path; and
 printing the ink composition onto a print medium, wherein printing is by externally ejecting the ink composition from a drop generator.

* * * * *